(12) United States Patent
Meleqi et al.

(10) Patent No.: US 12,710,818 B2
(45) Date of Patent: Aug. 18, 2026

(54) METHOD FOR CHARACTERIZING AN EMOTIONAL STATE INDUCED BY THE PRESENTATION OF A PRODUCT

(71) Applicant: ROBERTET S.A., Grasse (FR)

(72) Inventors: Xhino Meleqi, Cannes (FR); Laura Mauduit, Cannes (FR)

(73) Assignee: ROBERTET S.A., Grasse (FR)

( * ) Notice: Subject to any disclaimer, the term of this patent is extended or adjusted under 35 U.S.C. 154(b) by 0 days.

(21) Appl. No.: 19/303,073

(22) Filed: Aug. 18, 2025

(65) Prior Publication Data

US 2026/0056611 A1 Feb. 26, 2026

(30) Foreign Application Priority Data

Aug. 20, 2024 (FR) ..................................... 24 09006

(51) Int. Cl.
*G06F 3/01* (2006.01)

(52) U.S. Cl.
CPC .............. *G06F 3/015* (2013.01); *G06F 3/013* (2013.01); *G06F 2203/011* (2013.01)

(58) Field of Classification Search
None
See application file for complete search history.

(56) References Cited

U.S. PATENT DOCUMENTS

2008/0255949 A1 10/2008 Genco et al.
2009/0163777 A1* 6/2009 Jung .................... A61B 5/4064 600/301
2020/0000389 A1 1/2020 Moskowitz
2023/0297925 A1* 9/2023 Rosenberger ............ A61B 5/16 705/7.41

FOREIGN PATENT DOCUMENTS

CN 112259237 A 1/2021
CN 116211306 A 6/2023

OTHER PUBLICATIONS

Bradley, Margaret M. et al., “Measuring Emotion: The Self-Assessment Manikin and the Semantic Differential,” Journal of Behavior Therapy and Experimental Psychiatry vol. 25, No. 1, pp. 49-59, 1994.

Bensafi, M. et al., “Psychophysiological Correlates of Affects in Human Olfaction,” Neurophysiologie Clinique/Clinical Neurophysiology, vol. 32, No. 5, pp. 326-332, 2002.

(Continued)

*Primary Examiner* — Christopher J Kohlman
(74) *Attorney, Agent, or Firm* — Oliff PLC

(57) ABSTRACT

A method for characterizing a sensory stimulation elicited by the presentation of a product, including the steps of: subjecting a human subject to visual stimulation, then to a sensory stimulation to be characterized, and to an image showing several emojis; acquiring and processing gaze tracking signals during the presentation of the image to determine a first emoji fixed for the longest duration, the latter determining a group of themes likely to be experienced during the sensory stimulation; and acquiring and processing physiological measurement signals during the visual stimulation and sensory stimulation to identify a theme experienced within the group of themes.

12 Claims, 4 Drawing Sheets

(56) References Cited

OTHER PUBLICATIONS

Jack, Rachael E. et al., "Facial Expressions of Emotion Are Not Culturally Universal," Proceedings of the National Academy of Sciences, vol. 109, No. 19, pp. 7241-7244, 2012.
Warrenburg, S., "Effects of Fragrance on Emotions: Moods and Physiology," Chemical Senses, vol. 30, Supplement 1, 2005.
Porcherot, Christelle et al., "How Do You Feel When You Smell This? Optimization of a Verbal Measurement of Odor-Elicited Emotions," Food Quality and Preference, vol. 21, No. 8, pp. 938-947, 2010.
Churchill, Anne et al., "Comparison of Methods Used to Study Consumer Emotions Associated with Fragrance," Food Quality and Preference, vol. 21, No. 8, pp. 1108-1113, 2010.
Vidal, Leticia et al., "Use of Emoticon and Emoji in Tweets for Food-Related Emotional Expression," Food Quality and Preference, vol. 49, pp. 119-128, 2016.
Jaeger, Sara R. et al., "Emotion Questionnaires: A Consumer-Centric Perspective," Food Quality and Preference, vol. 30, No. 2, pp. 229-241, 2013.
Thomson, David M. H. et al., "Application of Conceptual Profiling in Brand, Packaging and Product Development," Food Quality and Preference, vol. 40, pp. 343-353, 2015.
Truss, "An educational companion to eats shoots & leaves," pp. 1-22, 2004.
Cowie, R. et al., "Emotion Recognition in Human-Computer Interaction," IEEE Signal Processing Magazine, vol. 18, No. 1, pp. 32-80, 2001.
Huang, Albert H. et al., "Exploring the Potential Effects of Emoticons," Information & Management, vol. 45, No. 7, pp. 466-473, 2008.
Huffaker, David A. et al., "Gender, Identity, and Language Use in Teenage Blogs," Journal of Computer-Mediated Communication, vol. 10, No. 2, 2005.
Wolf, Alecia, "Emotional Expression Online: Gender Differences in Emoticon Use," CyberPsychology & Behavior, vol. 3, No. 5, pp. 827-833, 2000.
Barros, Catarina et al., "Frontal Alpha Asymmetry and Negative Mood: A Cross-Sectional Study in Older and Younger Adults," Symmetry, vol. 14, No. 8, pp. 1-14, 2022.
Palacios-Ibañez, Almudena et al., "Predicting Decision-Making in Virtual Environments: An Eye Movement Analysis with Household Products," Applied Sciences, vol. 13, No. 12, pp. 1-14, 2023.
Rojas, Juan-Carlos et al., "Recognizing Decision-Making Using Eye Movement: A Case Study With Children," Frontiers in Psychology, vol. 11, pp. 1-11, 2020.
Wedel, Michel et al., "Modeling Eye Movements During Decision Making: A Review," Psychometrika, vol. 88, No. 2, pp. 697-729, 2023.
Lim, Jia Zheng et al., "Emotion Recognition Using Eye-Tracking: Taxonomy, Review and Current Challenges," Sensors, vol. 20, No. 8, pp. 1-21, 2020.
Zhu, Jianping et al., "Heart Rate Variability Monitoring for Emotion and Disorders of Emotion," Physiological Measurement, vol. 40, No. 6, pp. 1-18, 2019.
Golnar-Nik, Parnaz et al., "The Application of EEG Power for the Prediction and Interpretation of Consumer Decision-Making: A Neuromarketing Study," Physiology & Behavior, vol. 207, pp. 90-98, 2019.
Hyun, Yong J. et al., "A Neuro-Scientific Analysis of Affect and Cognition in Consumer Response to the Marketing Stimulus—EEG Analysis of the Relationship between Prefrontal Hemispheric Lateralization and Occipital Alpha Blocking in Ad Exposure," SSRN Electronic Journal, 2018.
Lin, Meng-Hsien (Jenny) et al., "Applying EEG in Consumer Neuroscience," European Journal of Marketing, vol. 52, No. 1/2, pp. 66-91, 2018.
Huffmeijer, Renske et al., "Asymmetric Frontal Brain Activity and Parental Rejection Predict Altruistic Behavior: Moderation of Oxytocin Effects," Cognitive, Affective, & Behavioral Neuroscience, vol. 12, No. 2, pp. 382-392, 2012.
Sandoval, Pamela Simón et al., "Impact of Emotional Appeal on Non-profit Advertising: A Neurophysiological Analysis," Journal of Consumer Behaviour, vol. 23, No. 1, pp. 1-15, 2023.
Masuo, Yoshinori et al., "Smell and Stress Response in the Brain: Review of the Connection between Chemistry and Neuropharmacology," Molecules, vol. 26, No. 9, 99, 1-29, 2021.
Bensafi, M., "Autonomic Nervous System Responses to Odours: The Role of Pleasantness and Arousal," Chemical Senses, vol. 27, No. 8, pp. 703-709, 2002.
Kadohisa, Mikiko, "Effects of Odor on Emotion, with Implications," Frontiers in Systems Neuroscience, vol. 7, pp. 1-6, 2013.
Marci, Carl D. et al., "Autonomic and Prefrontal Cortex Responses to Autobiographical Recall of Emotions," Cognitive, Affective, & Behavioral Neuroscience, vol. 7, No. 3, pp. 243-250, 2007.
Rodriguez, S. et al., "Subjective and Physiological Reactivity to Chocolate Images in High and Low Chocolate Cravers," Biological Psychology, vol. 70, No. 1, pp. 9-18, 2005.
Castaneda, D. et al., "A Review on Wearable Photoplethysmography Sensors and Their Potential Future Applications in Health Care," International Journal of Biosensors & BioeleXctronics, vol. 4, No. 4, pp. 1-18, 2018.
Grapperon, J., "La mesure de la réaction électrodermale," L'Encéphale, pp. 149-155, 2012.
Moya, Ingrit, et al., "What Can Neuromarketing Tell US about Food Packaging?," Foods, vol. 9, No. 12, pp. 1-18, 2020.
Garcia-Madariaga, Jesus et al., "Do Isolated Packaging Variables Influence Consumers' Attention and Preferences?," Physiology & Behavior, vol. 200, pp. 1-8, 2018.
Plutchik, Robert., "A Psychoevolutionary Theory of Emotions," Social Science Information, vol. 21, No. 4-5, pp. 529-553, 1982.
Zheng, Wei-Long et al., "Identifying Stable Patterns over Time for Emotion Recognition from EEG," IEEE Transactions on Affective Computing, vol. 10, No. 3, pp. 417-429, 2019.
Garcia-Madariaga, Jesus et al., "Revealing Unconscious Consumer Reactions to Advertisements That Include Visual Metaphors. A Neurophysioilogical Experiment," Frontiers in Psychology, vol. 11, No. 760, pp. 1-16, May 2020.
Lagast, S. et al., "Heart rate, electrodermal responses and frontal alpha asymmetry to accepted and non-accepted solutions and drinks," Food Quality and Preference, vol. 82, pp. 1-11, 2020.

* cited by examiner

VP
VEI
RP
NEI
NP
FP1S
FP2S
AF7S
AF8S
F3S
F4S
EPPS
DP%
DA%
DF%
FPD
AFD
FD
IC1
IC1
IC2
FPI
AFI
FI
PS
ET1
SS1
SCP1
SCPR
SMV
SAV
DM%
DA%
SCM
SCA
ICM
ICS
SMI
SAI
EIS
SS2
SCP2
HRPR
HRV
DH%
HRP
IHR
HRI
SCPR
EM1p
U1p
EM2p
U2p
ETC
ETPS
ETPR
IEe
HI
EMP
EP1
EP2

METHOD FOR CHARACTERIZING AN EMOTIONAL STATE INDUCED BY THE PRESENTATION OF A PRODUCT

TECHNICAL FIELD

The present invention relates to the characterization of a theme, in particular an emotional state of a human subject induced by a sensory stimulation perceived during the presentation of a product. The sensory stimulation may be a visual, olfactory, tactile, auditory, or gustatory stimulation.

STATE OF THE ART

Various methods for assessing the perception of a stimulation have already been proposed. Thus, self-assessment questionnaires have been proposed to identify emotional states (ref. [1]). It is also known to characterize an emotional state using physiological measurements, but these do not allow for the discrimination of emotions beyond a positive or negative valence (refs. [2]), [Ma et al., 2020]). Behavioral measures, such as facial expression analysis, have also been proposed to discriminate facial reactions according to the six basic emotions (Ref. [3]). However, this number of emotions remains very limited, with a majority of negative dominating emotions.

Another method uses mood mapping to emotionally classify tested olfactory products (Ref. [4]). This classification is based on the choice of the participants, among eight categories, of an emotional term that best reflects the emotion induced by the product. According to another method, the participants must associate an intensity (from 0 to 10) with each emotional term from a list provided for each product to be evaluated (Ref. [5]). A conscious nonverbal method based on a selection of emotional images has also been proposed, and a method using electroencephalography to measure a person's state of relaxation has been described (Ref. [6]).

It has also been noted (Ref. [7]) that analyzing emotions related to taste perception using questionnaires such as that described in Ref. [8] is unconventional and particular, as consumers tend to cognitively associate terms with products without directly experiencing them ([Ref. 9]). The emotions are described as short-term affective responses to stimuli with reinforcing potential. Therefore, research is needed to understand how consumers naturally express emotions related to smell or taste.

Moreover, the advent of the internet and social media has provided a new medium for the nonverbal expression of emotions through emojis (i.e., pictograms symbolizing an emotion). On the X platform (formerly Twitter), users refer to mood and emotions in 25% of tweets, the emojis being used more frequently than words. It turns out that emojis are considered not only a partial substitute for standard language (ref. [10]), but also an automatic and effortless way to convey emotions, regardless of gender or age group (refs. [11], [12], [13], and [14]). In Korea, emojis are the third most widely used language, after Korean and English (ref. [7]). Thus, emojis have somewhat revolutionized our communication patterns. When a person uses an emoji, they signify an action resulting from the emotion they experienced.

The use of electroencephalograms (EEG) is a method commonly used by researchers to assess the pleasure perceived by a human subject. More specifically, frontal alpha asymmetry (FAA) has been associated with emotion processing and affective psychopathology. High levels of right cortical activity have been associated with negative and withdrawal stimuli and behaviors, while increased left cortical activity has been associated with positive and approach stimuli and behaviors (ref. [15]).

The eye-tracking technology is frequently used to assess cognitive and decision-making processes (ref. [16], [17], [18]). Eye tracking can be correlated with the selection of emojis to express feelings, thus revealing the decision-making process. Eye tracking is also commonly used in various emotion recognition methods (ref. [19]).

To analyze the emotions, it has also been proposed to integrate three components: the physiological component that defines the intensity of emotions, the subjective component that determines the nature of emotions, and the behavioral component that identifies actions in response to emotions. However, this method is only effective if these three components can be integrated without complicating the experimental protocol (ref. [20).

All the methods mentioned above for characterizing an emotional state do not allow for the full analysis of the emotional responses of human subjects, due to the predominance of the conscious/subjective component. Moreover, the used objective physiological measures do not allow for the discrimination of felt emotions beyond the valence scale. The behavioral measures, such as facial and vocal analysis, only allow the study of a limited number of emotions, which may be insufficient to achieve certain objectives.

To overcome these limitations, the Applicant proposed a method for characterizing a perceived theme triggered by olfactory stimulation described in patent FR3129072 (or patent application US 2023/148941). In this method, the subject's experience emerges from the interaction with a product in a given context. This method examines the perceptions of a group of participants by integrating subjective and physiological components. The subjective component is assessed using questionnaires, while the physiological component involves recording the blood volume pulse BVP and measuring the skin conductance level SCL. Participant emotions are then calibrated using videos in virtual reality environments. These videos are presented to the participants, who are asked to evaluate them emotionally, while physiological measurements are acquired. The emotional term selected by each participant is then associated with the physiological reactions thus measured. These data are gathered in a database that is then used to identify the emotions generated in each participant when smelling a product. To this end, the physiological reactions measured during the olfactory perception of a product are compared to those calibrated using virtual reality videos. In this way, the emotion recognized in response to the product is the one whose physiological reactions obtained during calibration are closest to the physiological reactions measured in the presence of the product.

The resulting database, in which the subjective and physiological reactions are linked to emotions, serves as a basis for grouping emotions into different universes. However, this method has certain limitations. In particular, narrow groupings of opposing emotions in terms of pleasure can be observed. Furthermore, this method did not intend to use direct physiological measurements, such as electroencephalograms (EEG), to directly measure the pleasure induced by a product. This limitation appears to compromise the accuracy of classifying product perceptions into different universes, particularly for emotions such as energy and fear. The physiological reactions, such as the amplitude of the BVP, heart rate (HR), and SCL, appear similar to certain opposing emotions due to the lack of pleasure measurement, and therefore make it difficult to distinguish these emotions.

It also appears that the experimental protocol implemented in the method proposed by the Applicant constitutes another limitation. Indeed, in this protocol, participants were required to close their eyes while an experimenter held a bottle under their noses. This design limited the application of the method to olfactory perception alone, making it unsuitable for products requiring tasting.

There is therefore a need to adapt the method developed by the Applicant, described above, to overcome these limitations, and in particular to adapt it to the testing of products such as food and beverages.

SUMMARY

Embodiments relate to a method for determining a theme elicited by a product to be characterized, comprising the steps of: (a) presenting the product to be characterized to a human subject in a manner that subjects the subject to a sensory stimulation; (b) acquiring physiological measurement signals from the subject before and during the presentation of the product to be characterized; (c) presenting the subject with an image showing a set of emojis during or after the presentation of the product to be characterized, the subject being asked to make a visual choice of emoji in the image; (d) acquiring gaze tracking signals from the subject during the presentation of the image; (e) processing the gaze tracking signals to determine a first emoji number fixed for the longest duration by the subject, the longest duration fixed emoji determining a group of themes likely to be elicited in the subject by the presentation of the product to be characterized; and (f) processing the physiological measurement signals acquired before and during the presentation of the product to be characterized, to identify a theme elicited in the subject, in the determined group of themes.

By implementing various physiological measurements and analyzing eye movements while viewing an image showing emojis, it is possible to characterize a product thematically by determining a theme that may correspond to an emotional state elicited by sensory stimulation caused by the product's presentation based not on subjective responses provided by the subject, but on physiological measurements that directly measure a feeling of pleasure and emotional intensity. The physiological measurements also make it possible to evaluate such a theme elicited by sensory stimulation, which can occur, for example, when tasting a food, and can simultaneously act on several senses, such as taste, smell, vision, and hearing. The use of emojis allows overcoming language issues and cultural specificities that can vary from one subject to another. Moreover, the themes identified can be of all kinds, such as a type of emotion or even a film genre, for example.

According to one embodiment, the processing of physiological measurements comprises the use of a table listing themes, in which each theme is associated with an emoji number and a point defined by a pleasure score and an emotional intensity score.

The use of such a table of themes makes it possible to easily determine themes from the physiological measurements.

According to one embodiment, the processing of physiological measurements comprises steps of: determining a pleasure score and an emotional intensity score from the physiological measurements; identifying in the table all themes corresponding to the first determined emoji number; and calculating a distance between a point defined by the determined pleasure and emotional intensity scores and each of the points associated with the themes identified in the table, the theme identified for the subject corresponding to the smallest calculated distance.

The determination of the pleasure and emotional intensity scores from the physiological measurements makes it possible to establish a link with the table of themes and to easily determine a theme for characterizing the sensory stimulation that can act on different senses.

According to one embodiment, the processing of the gaze tracking signals provides a second emoji number fixed for the longest duration by the subject, when another emoji has been fixed by the subject for at least 50% of the fixation time of the emoji corresponding to the first emoji number fixed for the longest duration.

The possibility of providing a second emoji allows for a more detailed characterization of the theme experienced by a human subject, triggered by the sensory stimulation.

According to one embodiment, the acquisition and processing of the physiological measurement signals comprises steps consisting of: acquiring electroencephalogram signals from electrodes placed on the subject's head, the electrodes comprising right and left pairs of frontal electrodes, during the presentation of the product to be characterized; processing the electroencephalogram signals to determine percentage deviations between the right and left electrodes of each of the pairs of frontal electrodes; for each percentage deviation, determining a pleasure index based on whether the percentage deviation falls within a range of percentage values in a set of percentage ranges specified for the pleasure indices; and determining a pleasure score from the pleasure indices.

The use of electroencephalogram signals advantageously makes it possible to evaluate a sensation of pleasure. Furthermore, the use of percentage ranges associated with pleasure index values makes it easy to evaluate this sensation of pleasure in a manner compatible with other physiological measurement processing methods.

According to one embodiment, the pleasure score is determined by adding the pleasure indices to a pleasure rating determined based on whether a pleasure value indicated by the subject belongs to a pleasure value range in a set of pleasure ranges determined for the pleasure values.

Combining several measurements with a value provided by the subject makes it possible to take into account a subjective aspect, which allows for a more precise determination of the pleasure score.

According to one embodiment, the acquisition and processing of physiological measurement signals comprises steps of: acquiring electrodermal activity signals from electrodermal activity sensors placed on the subject, during a rest period and during a presentation period of the product to be characterized; processing the electrodermal activity signals to determine average values and maximum deviations in the amplitude of the electrodermal activity and the heart rate values of the subject, between the rest period and the period of presentation of the product to be characterized; determining a percentage deviation in the average electrodermal activity values, a percentage deviation in the maximum deviations in the amplitude of electrodermal activity and a percentage deviation in the heart rate values, between the rest period and the period of presentation of the product to be characterized; and for each percentage deviation in electrodermal activity and heart rate, determining an emotional intensity index based on whether the percentage deviation falls within a range of percentage values of a set of percentage ranges determined for the percentage deviation; and determining an emotional intensity score from the emotional intensity indices.

The combined measurement of the electrodermal activity and cardiac activity and the comparison of the measurements before and during the sensory stimulation to be characterized makes it possible to objectively determine an emotional intensity felt by the subject. Here again, the use of a range of values makes it easy to determine index values and an emotional intensity score.

According to one embodiment, the emotional intensity score is determined by adding the emotional intensity indices to an emotional intensity rating determined based on whether an emotional intensity value indicated by the subject belongs to a range of emotional intensity values in a set of emotional intensity ranges determined for the emotional intensity values.

Combining multiple measurements with a value provided by the subject allows for a subjective aspect to be taken into account, thereby more accurately determining the emotional intensity score.

According to one embodiment, the subject belongs to a group of participants, the method comprising the steps of: performing steps (a) to (f) for each participant in the group of participants to determine a theme for the participant; and determining a thematic characterization result of a perception of the product to be characterized based on the themes determined for all participants in the group of participants.

Thus, by applying the method to a panel of participants, it is possible to characterize sensory stimulation on a thematic level, for example, caused by the perception of a product.

According to one embodiment, the sensory characterization result comprises a list of themes in which each theme is associated with a theme score determined based on the number of times the theme was identified for a participant in the group of participants.

Determining a list of themes makes it possible to finely characterize sensory stimulation, for example, caused by the perception of a product.

Embodiments may also relate to a system comprising: a computer, an eye-tracking device connected to the computer, physiological parameter measurement devices connected to the computer, and a display screen connected to the computer, the processor being configured to implement the previously defined method.

According to one embodiment, the physiological parameter measurement devices comprise: a set of electroencephalogram electrodes, and a device for measuring electrodermal and cardiac activity.

BRIEF DESCRIPTION OF THE FIGURES

The present invention will be better understood with the aid of the following description of exemplary embodiments with reference to the appended figures, in which identical reference signs correspond to structurally and/or functionally identical or similar elements.

DETAILED DESCRIPTION

Figure 1:
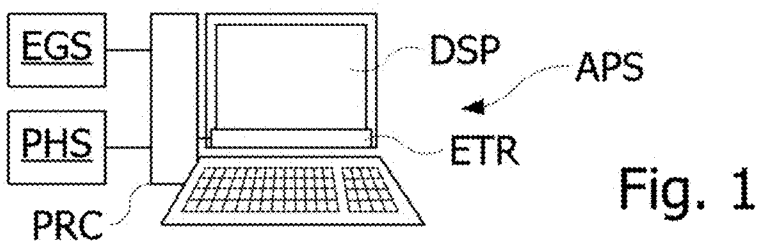
FIG. 1 schematically represents a system for acquiring and processing physiological measurements and responses of human subjects, according to one embodiment.

FIG. 1 shows a system APS for acquiring and processing physiological measurements and responses of human subjects from a group of human subjects participating in a product test, to characterize the perception of the product. The acquisition and processing system APS comprises a computer PRC connected to a display screen DSP, a set of EEG sensors EGS, a device PHS allowing to measure the physiological parameters such as electrodermal activity and cardiac activity, and an eye tracking system ETR.

The eye tracking system ETR is configured to monitor and analyze a person's eye movements. It comprises an optical camera that projects near-infrared light onto the cornea, thereby facilitating eye position detection. It provides measurements indicating where the person is focusing their gaze at any given moment.

Figure 2:
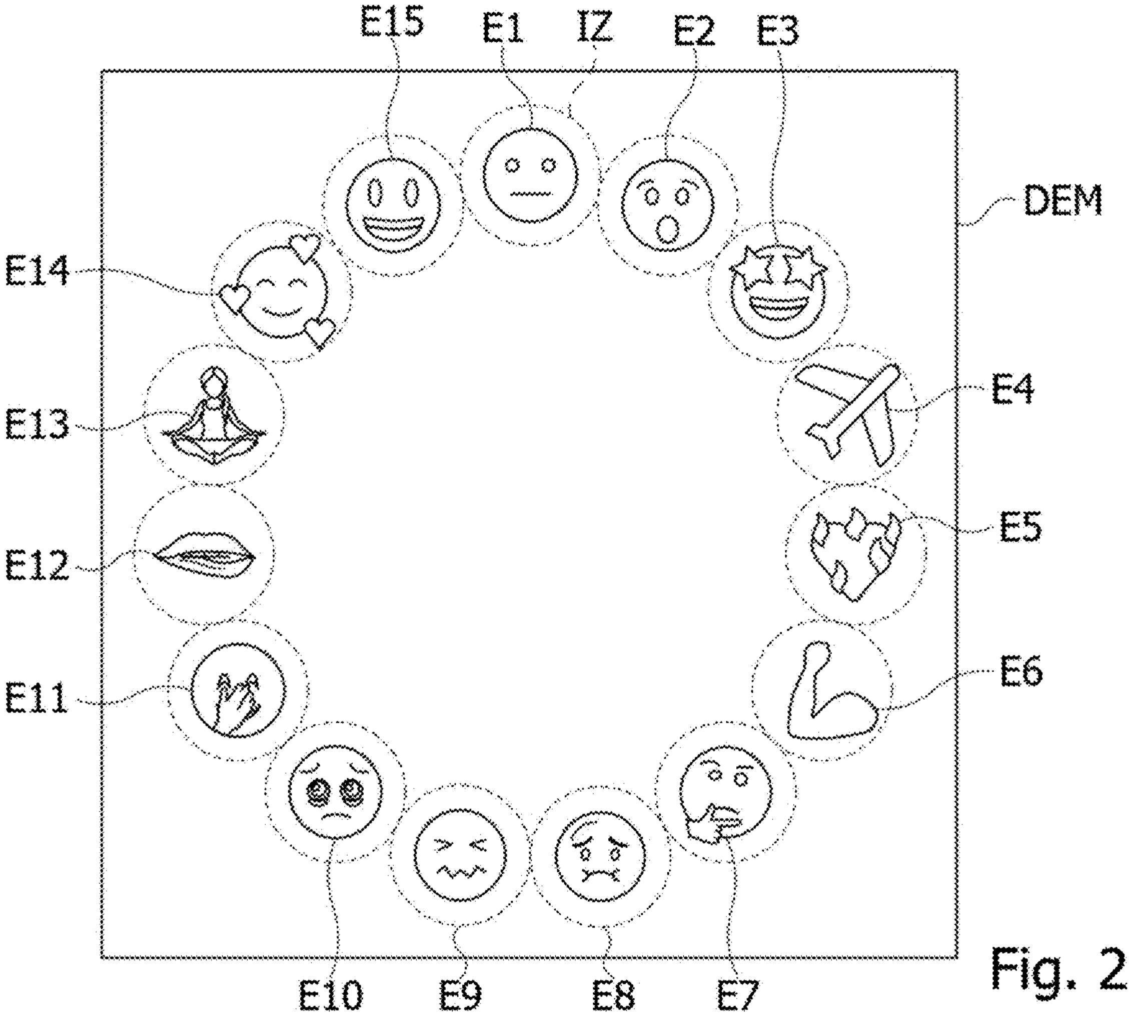
FIG. 2 represents an image presented to a human subject, for determining emotions felt by the latter, according to one embodiment.

According to one embodiment, a first type of measurement is carried out by placing a test participant in front of the display screen DSP and by displaying on this screen an image such as the image DEM shown in FIG. 2, for a duration for example equal to 10 s. During the time when the participant can observe the image DEM displayed on the screen DSP, the eye tracking system ETR is active and acquires the path of a central point observed by the participant. The image DEM presents emojis E1-E15 representing primary emotions selected according to their relevance to the type of product to be tested. In the example in FIG. 2, the image DEM presents about fifteen emojis comprising:

- an emoji E1 illustrating a neutral emotional state that can correspond to states ranging from boredom to a certain pleasant state,
- an emoji E2 illustrating emotional states of surprise ranging from a state of great pleasant surprise to a state of great unpleasant surprise, including a neutral state of distraction,
- an emoji E3 illustrating emotional states of wonder ranging from ecstasy to astonishment,
- an emoji E4 illustrating emotional states of escape ranging from the search for adventure to a state of flight,
- an emoji E5 illustrating emotional states of passion ranging from exaltation to ardor,
- an emoji E6 illustrating emotional states of energy feeling ranging from revitalizing energy to stimulating energy,
- an emoji E7 illustrating emotional states of curiosity ranging from enthusiasm to doubt, including interest,
- an emoji E8 illustrating emotional states of disgust ranging from loathing to boredom to ardor,
- an emoji E9 illustrating unpleasant emotional states ranging from dissatisfaction to rejection,
- an emoji E10 illustrating emotional states of nostalgia ranging from melancholy to reminiscence,
- an emoji E11 illustrating emotional states of guilty pleasure ranging from the feeling of committing a delightful sin to mild indulgence,
- an emoji E12 illustrating emotional states of sensuality ranging from eroticism to delicacy,
- an emoji E13 illustrating an emotional state of relaxation ranging from well-being to calm, an emoji E14 illustrating emotional states of tenderness ranging from intense pleasure to a simple feeling of comfort, and an emoji E5 illustrating emotional states of joy ranging from ecstasy to serenity.

Figure 3:
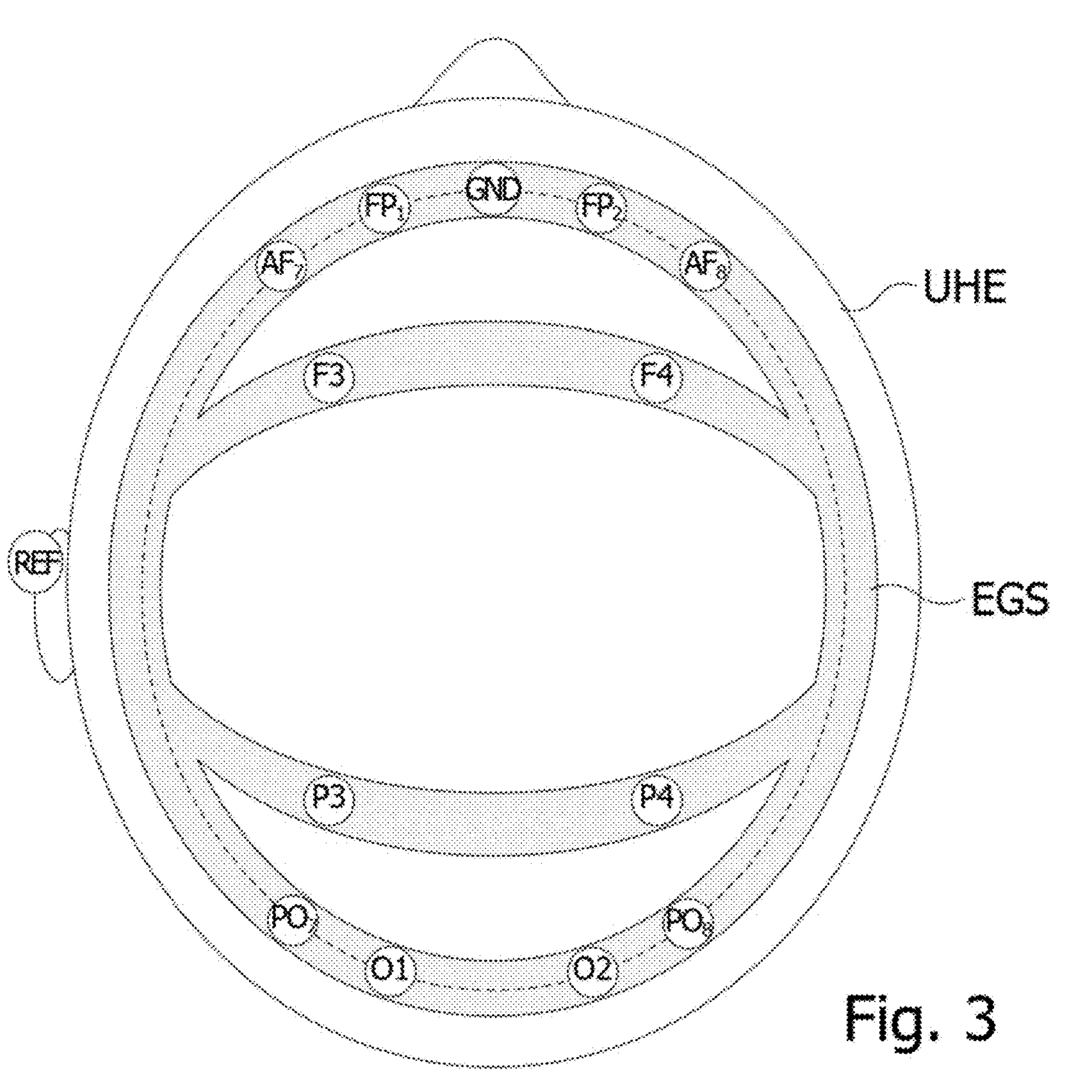
FIG. 3 is a schematic top view of a set of EEG sensors, used in the method according to one embodiment.

FIG. 3 represents the set of electroencephalogram sensors EGS in the form of an headset EGS on which twelve electrodes are distributed, each allowing the capture of the electrical activity of a hundred neurons. The electrodes are placed on the headset in order to obtain information on the emotional state of the user wearing the headset on the head UHE. Thus, these electrodes comprise six left frontal electrodes F3, FP1, AF7, and right F4, FP2, AF8, two left parietal electrodes P3 and right P4, two left occipital parietal electrodes PO7 and right PO8, and two left occipital electrodes O1 and right O2 (and a ground electrode GND in the central frontal position). Research has highlighted the effectiveness of EEG signals in assessing an emotional index. Specifically, these studies have focused on asymmetric activity in the frontal brain (refs. [21], [22], [23]). This asymmetry consists of observing differences in activity between the right and left frontal areas in the alpha band (8-12 Hz). Such differences may indicate reactions such as approach or withdrawal motivations. According to the frontal asymmetry theory FAA of EEG, increased activity in the right hemisphere signifies withdrawal motivation, while increased activity in the left hemisphere suggests approach motivation (refs. [24], [25]). Furthermore, attention can be measured using the theta/alpha index algorithm. This measure focuses on the parietal electrodes P3 and P4 for theta and the frontal electrodes F3 and F4 for alpha (ref. [25]).

Figure 4:
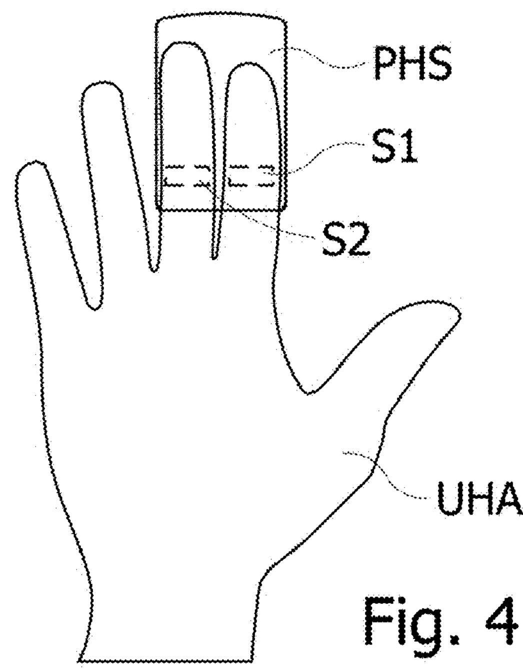
FIG. 4 is a schematic front view of a device for measuring HR, SCL and BVP, used in the method according to one embodiment, FIG. 5 schematically represents functions of the acquisition and processing system, according to one embodiment.

FIG. 4 shows the device PHS for measuring electrodermal activity (EDA) and cardiac activity. The device PHS may be a photoplethysmograph that uses an optical sensor to measure infrared light to detect volumetric changes in blood circulation at the fingertips. In the example of FIG. 4, the device PHS is in the form of a case to be attached using a strap to the index and middle fingers of a hand UHA of the user. The device PHS comprises, for example, an infrared light sensor S1 that is placed on the index finger to measure electrodermal activity and an infrared light sensor S2 that is placed on the middle finger to measure the cardiac activity. The measurements made by the device PHS may be carried out, for example, with a sampling rate of approximately 64 samples per second.

The sensory information from smelling or tasting food is processed by the olfactory system. Signals are then sent to the brain to regulate the activity of the autonomic nervous system (ANS) (ref. [26]). The heart rate is a well-established measure of the ANS activity (refs. [27], [28, [29], [30]). The heart is regulated by the ANS, particularly by its sympathetic (excitatory) and parasympathetic (inhibitory) branches. These branches exert regulatory control over heart rate by influencing the activity of the sinus node, the heart's natural pacemaker. The cardiac activity measurement is one of the components used to assess the user's emotional arousal through sympathetic nervous system activity (ref. [31]).

The electrodermal activity (EDA) refers to the electrical conductance or potential of the skin, particularly of the hands, which can be measured as a reflex response to emotional stimuli. The EDA serves as an electrophysiological indicator reflecting the activity of the sympathetic nervous system (SNS). This activity originates from the sweat glands, responsible for the secretion of aqueous sweat and distributed throughout the body, including the palms of the hands. While the primary function of these glands is thermoregulation, resulting in cutaneous vasodilation in response to high temperatures, they are also innervated by two types of neurons. The neurons using acetylcholine as a neurotransmitter are responsible for the electrodermal activity of the sweat glands in response to SNS activation. In contrast, neurons using adrenergic neurotransmitters induce vasodilation in response to increases in temperature. Therefore, the phenomenon of sweating without vasodilation, called "emotional sweat", occurs due to the EDA in response to the SNS activation (ref. [32]).

Figure 5:
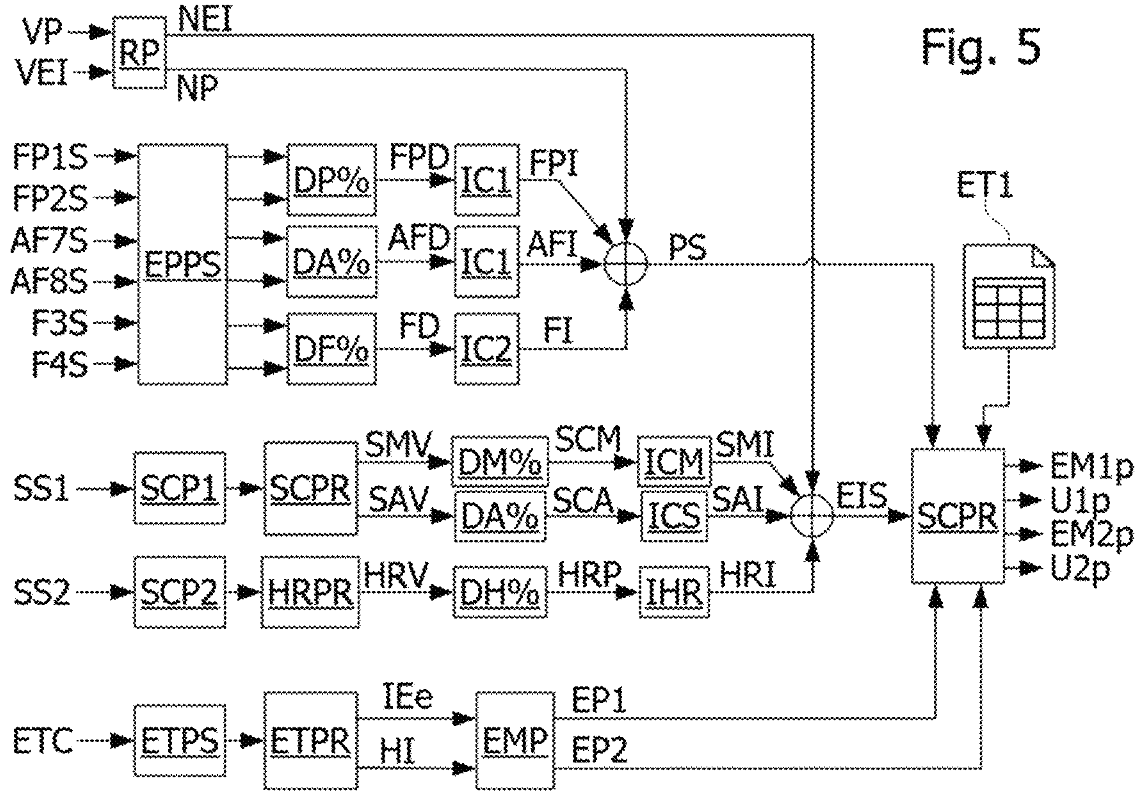

According to an embodiment illustrated by FIG. 5, the APS system implements a method for characterizing an emotional state caused by sensory stimulation from physiological measurements acquired during a test session involving several participants, taking place in accordance with a specific protocol. According to an example of a protocol, each of the test participants is placed in front of a system such as the APS system, places the headset EGS on their head and the device PHS on one of their hands. Bottles containing samples of products to be tasted are placed in front of each participant. The eye tracking system ETR is calibrated on the display screen DSP to track eye movements while maintaining a static head position. The signals provided by the electrodes of the headset EGS and by the device PHS are also checked and calibrated if necessary before starting the test. Thus, the test begins with a calibration of the system ETR, by asking the participants to fixate for 30 s on a cross displayed on the screen DSP. This first 30-s step is followed by a 5-s instruction asking participants to grab a first bottle of product sample and taste its contents. Participants are then asked to fix their gaze for 10 seconds. The image DEM is then displayed for 10 seconds so that participants can visualize the emojis that best correspond to the sensations experienced while tasting the sample. This step is followed by a new fixation step during which participants are then asked to fix their gaze for 10 seconds. During a final step, the participants can be asked to complete a questionnaire. The questionnaire could include the following questions:

1. Which emoji do you select?
2. What pleasure value do you assign to the product, compared to your expectations (from 0 indicating intense displeasure to 10 indicating intense pleasure)?
3. What emotional intensity value do you assign to the emotion felt when you tasted the product (from 0 indicating no emotional intensity to 10 indicating very strong emotional intensity)?

Based on the pleasure and emotional intensity values provided by each participant, a function RP of the computer PRC determines pleasure NP and emotional intensity (EI) NEI ratings as follows:

if the value is less than 3, the rating is set to −2, if the value is comprised between 3 inclusive and 5 not inclusive, the rating is set to −1, if the value is 5, the rating is set to 0, if the value is comprised between 5 not inclusive and 7 inclusive, the rating is set to 1, if the value is greater than 7, the rating is set to 2.

The computer PRC determines several parameters based on the data determined from the measurements. These parameters comprise two main parameters, namely: a pleasure index PS and an EI index EIS. The pleasure index PS takes into account the evaluation of pleasure and frontal alpha wave asymmetry (FAA) in a 10-s window after tasting the product. The EI EIS index is determined based on the variation in heart rate between the 30-s window after tasting the product and the 10-s window before tasting, the average variations and possibly the amplitude of the EDA level before and after tasting.

For this purpose, throughout the test, the signals FP1S, FP2S, AF7S, AF8S, F3S, F4S from the electrodes FP1, FP2, AF7, AF8, F3, F4 of the headset EGS, the signals SS1, SS2 from the sensors S1, S2 of the device PHS and the signals ETC from the eye tracking system ETR are recorded and processed. The signals FP1S, FP2S, AF7S, AF8S, F3S, F4S from the headset EGS are pre-processed by a function EPPS of the processor PRC. The function EPPS samples the signals FP1S, FP2S, AF7S, AF8S, F3S, F4S at a frequency of 256 Hz, then filters the samples obtained by a bandpass filter from 1 to 25 Hz. This first filtering is followed by a three-step filtering. In the first step, large amplitude artifacts are removed using Artifact Subspace Reconstruction (ASR). In the second step, Independent Component Analysis (ICA) is applied to the filtered signals to extract the sources of the components influencing the signals. In the third step, the Multiple Artifact Rejection Algorithm (MARA) is executed to automatically classify the ICA components as artifacts. This independent component classification is performed using a pre-trained model. The components that are not related to brain activity, such as eye blinks or pulse, can thus be removed. Once the signals are filtered, different frequency calculations such as Individualized Alpha Frequency (IAF) analysis are applied to obtain signals related to alpha, beta, gamma, delta and theta waves (ref. [33]). The signals related to the different waves are then processed to calculate EEG indices such as frontal alpha asymmetry (FAA) following methodologies described in the existing literature, and using frequency bands delimited using the Welch method to obtain a power spectral density. DP %, DA %, DF % functions convert the obtained measurements into percentage values of deviation (FPD, AFD, FD) between the corresponding right and left electrodes.

Thus, the function DP % calculates a percentage deviation FPD between the right and left signals from the electrode pair FP1-FP2, the function DA % calculates a percentage deviation AFD between the right and left signals from the electrode pair AF7-AF8, and the function DF % calculates a percentage deviation FPD between the right and left signals from the electrode pair F3-F4. The percentage deviations FPD and AFD are processed to obtain indices FPI and AFI as follows:

- if the percentage deviation is less than −15%, the corresponding index is set to −2,
- if the percentage deviation is comprised between −15% (inclusive) and −5% (exclusive), the corresponding index is set to −1,
- if the percentage deviation is comprised between −5% (inclusive) and 4% (exclusive), the corresponding index is set to 0,
- if the percentage deviation is comprised between 4% and 15% (inclusive), the corresponding index is set to 1,
- if the percentage deviation is greater than 15%, the corresponding index is set to 2.

The percentage deviation FD is processed to obtain an index FI as follows:

- if the percentage deviation is less than −15%, the corresponding index is set to −3.
- if the percentage deviation is comprised between −15% (inclusive) and −5% (exclusive), the corresponding index is set to −2.
- if the percentage deviation is comprised between −5% (inclusive) and 4% (exclusive), the corresponding index is set to 0.
- if the percentage deviation is comprised between 4% and 15% (inclusive), the corresponding index is set to 2.
- if the percentage deviation is greater than 15%, the corresponding index is set to 3.

The indices FPI, AFI, and FI are then added with the pleasure rating NP to obtain the pleasure score PS.

The analysis of the electrodermal activity EDA and the cardiac activity is performed by the computer PRC using the signals SS1 from the sensors S1. A preprocessing function SCP1 samples the signal SS1 at 32 Hz. The function SCP1 smooths the skin conductance level SCL signals related to the EDA to remove small amplitude artifacts. A function SCPR processes the output signals of the function SCP1 to obtain mean values SMV and maximum amplitude deviations SAV over time segments of interest, namely during the display of the cross on the screen DSP, and during or after tasting the product to be characterized. From the values SMV, SAV, functions DM %, DA % determine respectively percentage deviations SCM, SCA between the rest period and during or after tasting the product sample, mean values SMV and maximum amplitude deviations SAV.

For the heart rate analysis, a function SCP2 of the computer PRC can also apply sampling processing to the signal SS2 at 32 Hz and sample smoothing to remove low-amplitude artifacts. A function HRPR processes the smoothed samples to determine the time between each heartbeat, which allows the calculation of an instantaneous heart rate HRV during rest and after tasting the product. A function DH % processes the instantaneous heart rate to obtain a percentage HRP of the heart rate variation between the rest period and the period during and after tasting the product sample.

Functions ICM and ICS process the variation percentages SCM, SCA to determine the mean value SMI and maximum amplitude deviation SAI indices, as follows:

- if the variation percentage ICM is less than 0%, the mean value index SMI is set to −3,
- if the variation percentage ICM is comprised between 0% and 4% (inclusive), the mean value index SMI is set to 0,
- if the variation percentage ICM is greater than 4%, the mean value index SMI is set to 2,
- if the variation percentage ICS is less than 8%, the maximum amplitude deviation index SAI is set to 0,
- if the variation percentage ICS is comprised between 8% and 15% (inclusive), the index SAI is set to 1,
- if the variation percentage ICS is greater than 15%, the index SAI is set to 2.

A function IHR processes the percentage HRP of the heart rate variation to determine an index HRI of heart rate variation, as follows:

- if the percentage variation HRP is less than −6%, the index HRI is set to −2,
- if the percentage variation HRP is comprised between −6% and 6% (inclusive), the index HRI is set to 0,
- if the percentage variation HRP is greater than 6%, the index HRI is set to 2.

The mean and maximum amplitude deviation indices SMI, SAI, and the index HRI are summed with the EI rating NEI to obtain the EI score EIS.

Thus, in calculating the pleasure PS and EI EIS scores, a greater importance is given to physiological measurements than to the pleasure values VP, VEI, and values EI provided by the participant.

The system ETR records the coordinates ETC of the gaze of the right and left eyes on the screen at a sampling rate of 60 Hz. A function ETPS of the computer PRC receives the coordinates ETC and determines at each instant, a running average on the X coordinates of the right and left eyes, as well as on the Y coordinates of the right and left eyes, to obtain the average coordinates (Xmoy and Ymoy) of the central point of gaze. A function ETPR determines the time spent IEe in each area of interest IZ of emoji e according to the trajectory of the central point of gaze of the participant, the emojis being arbitrarily numbered from 1 to 15. For this purpose, it is considered that the area of interest IZ of each emoji E1-E15 extends over the entire display area of the emoji in the image DEM and over a margin of a few millimeters around the emoji. The fixation durations of each emoji are accumulated. According to one embodiment, the area of interest of an emoji is delimited by a circle centered on the emoji and having a diameter equal to the distance from either of the two adjacent emojis.

The function ETPR can also determine the number of emoji fixations per emoji, with the understanding that an emoji fixation is counted when the time during which the gaze is maintained in the area of interest IZ of the emoji exceeds a certain minimum threshold value. This minimum threshold value is, for example, set at 200 ms. A total number of emoji fixations can thus also be determined. The function ETPR also determines a hesitation score HI based on the total time spent in the emoji areas of interest IZ divided by the total number of emoji fixations.

A function EMP processes the fixation durations IEe of each emoji e to determine whether one or more emojis are relevant to the participant's emotional experience. Since each emoji is numbered, the function EMP determines a first number EP1 for the most relevant emoji, that is to say the emoji that was fixed for the longest fixation time. A second most relevant emoji number EP2 can also be determined. The second most relevant emoji is the one that was fixed by the participant for at least 50% of the time spent in the area of interest of the most relevant emoji. If the hesitation score HI is less than or equal to 1, the second relevant emoji is considered.

The pleasure score PS, the emotional intensity score EIS, and the first most relevant emoji number EP1, as well as possibly the second most relevant emoji number EP2, are provided to a function SCPR of the PRC computer with a table ET1. The table ET1 contains a list of emotions, each emotion being associated in the table with an emoji number and pleasure and EI score values. The emotions in Table ET1 are also grouped by emotional universe. Table ET1 can be defined according to the following example:

TABLE 1

| Universe | Emotion | Emoji Number | Pleasure Score | EI Score |
|---|---|---|---|---|
| Balanced Neutrality | Neutral | 1 | 0 | 0 |
| Emotional satisfaction | Joy | 2 | 2 | 0 |
| | Serenity | 2 | 4 | −3 |
| | Ecstasy | 2 | 8 | 8 |
| | Curiosity | 10 | 4 | 4 |
| | Interest | 10 | 1 | 0 |
| | Enthusiasm | 10 | 8 | 8 |
| Emotional tranquility | Tenderness | 3 | 4 | 0 |
| | Comfort | 3 | 0 | −5 |
| | Intense pleasure | 3 | 8 | 8 |
| | Calm | 4 | 2 | 0 |
| | Relaxation | 4 | 4 | −3 |
| | Well-being | 4 | 8 | 4 |
| Sensual temptation | Sensuality | 5 | 4 | 4 |
| | Delicacy | 5 | 0 | −3 |
| | Eroticism | 5 | 8 | 8 |

TABLE 1-continued

| Universe | Emotion | Emoji Number | Pleasure Score | EI Score |
|---|---|---|---|---|
| Indulgent temptation | Guilty pleasure | 6 | 4 | 0 |
| | Mild indulgence | 6 | 0 | −5 |
| | Delightful sin | 6 | 8 | 6 |
| Emotional arousal | Pleasant surprise | 15 | 3 | 4 |
| | Pleasant astonishment | 15 | 8 | 8 |
| | Wonder | 14 | 4 | 2 |
| | Astonishment | 14 | 0 | −4 |
| | Ecstasy | 14 | 8 | 8 |
| | Escape | 13 | 4 | 0 |
| | Flight | 13 | 2 | −3 |
| | Adventure | 13 | 8 | 8 |
| | Passion | 12 | 4 | 2 |
| | Ardor | 12 | 6 | 4 |
| | Exaltation | 12 | 8 | 8 |
| Stimulant | Energizing | 11 | 4 | 2 |
| | Stimulating | 11 | 2 | 0 |
| | Revitalizing | 11 | 8 | 8 |
| Nostalgic reflection | Nostalgia | 7 | 2 | 0 |
| | Reminiscence | 7 | 5 | 6 |
| | Melancholy | 7 | −3 | 0 |
| Negative aversion | Disgust | 9 | −4 | 0 |
| | Boredom | 9 | 0 | −6 |
| | Repugnance | 9 | −8 | 8 |
| | Dissatisfaction | 8 | 0 | −6 |
| | Displeasure | 8 | −4 | 0 |
| | Rejection | 8 | −8 | 8 |
| | Unpleasant surprise | 15 | −2 | 4 |
| | Unpleasant Astonishment | 15 | −6 | 8 |
| | Doubtful | 10 | −3 | 0 |
| Fleeting attention | Distraction | 15 | 0 | 0 |

In this example, the table ET1 associates each emotion with an emoji number ranging from 1 to 15, and pleasure and EI indices ranging from −8 corresponding to a very negative feeling of pleasure or emotional intensity to +8 corresponding to a very positive feeling of pleasure or emotional intensity, through 0 corresponding to a neutral feeling. The table ET1 thus defines a set of points in a three-dimensional space (x=emoji number, y=pleasure score, z=EI score).

From the emoji number EP1, and possibly EP2, and the pleasure PS and emotional intensity EIS scores of each participant and the table ET1, the function SCPR performs a classification for each participant. The first classification allows the participant's reaction to be classified into one of the emotion universes specified in the table ET1, while the second allows the participant's emotion to be classified within this universe.

To this end, the function SCPR considers the plane (x=EP1, y, z) of this three-dimensional space, corresponding to the participant's emoji number EP1, and determines the distance between the participant's point (x=EP1, y=PS, z=EIS) and each of the points defined in the table ET1, located in this plane. The emotion corresponding to the point defined by the table ET1, located closest to the participant's point p in the plane corresponding to the participant's emoji number EP1, determines the emotion EM1*p* felt by the latter. The function SCPR then identifies an emotional universe U1*p* in the table ET1 for the participant p, based on the emotion EM1*p*.

If a second emoji number EP2 was selected by analyzing the signal ETC, a second emotion EM2*p* is determined for the participant p in the same way by considering the point in the table ET1 closest to the participant's point in the plane (x=EP2, y, z) defined by the second emoji number EP2. This emotion classification method thus makes it possible to identify a specific emotion that best corresponds to what the participant felt. The function SCPR then identifies an emotional universe U2*p* in the table ET1 for the participant p, based on the emotion EM2*p*.

According to one embodiment, if a participant's point is too far from the other points in the same emotional group corresponding to the emoji number EP1 or EP2, this means that the emotional group in question does not correspond to the participant's reaction. To this end, a maximum distance threshold value can be applied. This maximum distance threshold value can be defined according to each emotional group. It can, for example, correspond to the maximum distance between the points in the emotional group. Thus, the distance thresholds can be defined as specified in the following table:

TABLE 2

| Emoji number | Maximum distance threshold |
|---|---|
| 0 | 0 |
| 1 | 4.00 |
| 2 | 11.70 |
| 3 | 15.26 |
| 4 | 8.06 |
| 5 | 13.60 |
| 6 | 13.30 |
| 7 | 10.00 |
| 8 | 16.12 |
| 9 | 16.12 |
| 10 | 13.60 |
| 11 | 10.00 |
| 12 | 7.21 |
| 13 | 12.53 |
| 14 | 14.42 |
| 15 | 14.00 |

The analysis is then redirected to another emotional group (or emoji number). This other group can be the one corresponding to the second emoji EP2 selected by the signal analysis ETC. If there is no second emoji, then no emotion is assigned.

Then, the processor PRC determines a score for each emotion listed in the table ET1, based on the number of times the emotion (EM1*p*, EM2*p*) is identified among the participants in the participant group. To this end, the processor PRC can apply a weighting of 2 when only one emotion EM1*p* is identified among the participant p and weightings whose sum is equal to 2, when two emotions EMP1, EMP2 are identified. These weightings can be set at 1 and 1, or 1.25 and 0.75 or even determined according to the respective fixation times of the two corresponding emojis EP1, EP2.

The processor PRC also determines a score for each emotional universe listed in table ET1, based on the number of times the emotional universe (U1*p*, U2*p*) is identified among the participants in the participant group. To this end, the emotion weighting rules can be applied to the emotional universes. The score for each emotional universe can also be determined by adding the scores obtained for the emotions belonging to the emotional universe as specified in table ET1.

The emotion and emotional universe scores obtained for a product can be presented in the form of a map representation of emotions and emotional universes. In this representation, the emotional universes are represented as rectangles whose area corresponds to the score associated with the emotional universe. Then, each emotion in each emotional universe is also represented as a rectangle whose area corresponds to the score associated with the emotion, this rectangle being inscribed within the rectangle corresponding to the emotional universe.

Figure 6A:
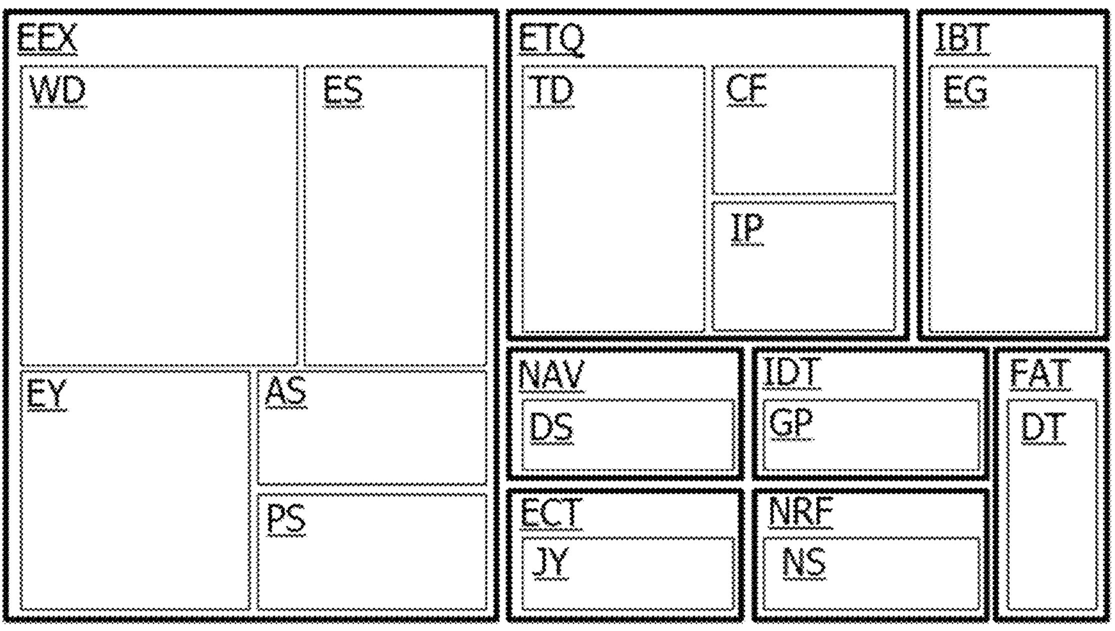
FIGS. 6A, 6B are representations illustrating a characterization of an emotional state elicited by sensory stimulation, determined by the acquisition and processing system, according to one embodiment.
Figure 6B:
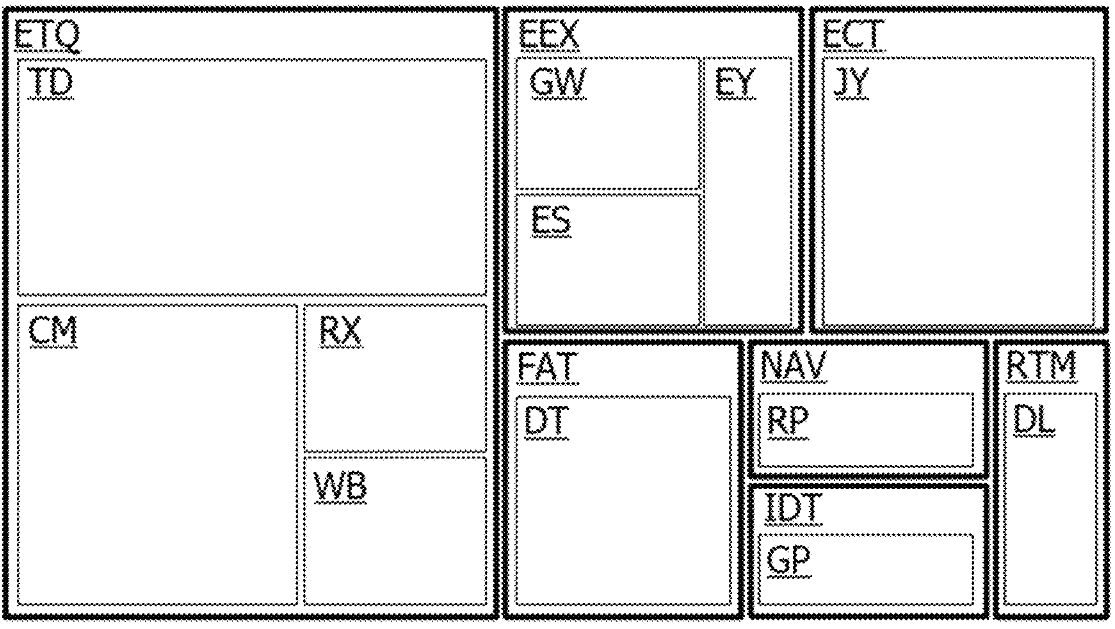

FIGS. 6A, 6B represent examples of score list mappings obtained for a product. The representation in FIG. 6A comprises a large rectangle EEX corresponding to the emotional excitement universe, a smaller rectangle ETQ corresponding to the emotional tranquility universe, an even smaller rectangle IBT corresponding to the stimulating energy universe, four rectangles NAV, IDT, ECT, NRF of the same size even smaller corresponding to the negative aversion, indulgent temptation, emotional satisfaction, and nostalgic reflection universes, and finally an even smaller rectangle FAT corresponding to the fleeting attention universe. The rectangle EEX comprises rectangles of different areas including a rectangle WD corresponding to the emotion of wonder, a rectangle ES corresponding to the emotion of escape, a rectangle EY corresponding to the emotion of ecstasy, and two rectangles AS, PS of the same size corresponding to the emotions of astonishment and passion. The rectangle ETQ comprises rectangles of different surfaces including a TD rectangle corresponding to the emotion of tenderness, two rectangles CF, IP of the same size corresponding to the emotions of comfort and intense pleasure. The rectangle IBT comprises a rectangle EG corresponding to the emotion of energizing. The rectangle NAV comprises a rectangle DS corresponding to the emotion of dissatisfaction. The rectangle IDT comprises a rectangle GP corresponding to the emotion of guilty pleasure. The rectangle ECT comprises a rectangle JY corresponding to the emotion of joy. The rectangle FAT comprises a rectangle DT corresponding to the emotion of distraction.

The representation of FIG. 6B comprises a large rectangle ETQ corresponding to the universe of emotional tranquility, two smaller rectangles EEX, FCT corresponding to the universes of emotional arousal and emotional satisfaction, an even smaller rectangle FAT corresponding to the universe of fleeting attention, two rectangles NAV, IDT of the same size, even smaller corresponding to the universes of negative aversion and indulgent temptation, and finally an even smaller rectangle RTM corresponding to the universe of sensual temptation. The rectangle ETQ comprises rectangles of different surfaces including a rectangle TD corresponding to the emotion of tenderness, a rectangle CM corresponding to the emotion of calm, and two rectangles RX, WB of the same size corresponding to the emotions of relaxation and well-being. The rectangle EEX comprises rectangles of different surfaces including a rectangle GW corresponding to the emotion of distance, a rectangle ES corresponding to the emotion of escape, and a rectangle EY corresponding to the emotion of ecstasy. The rectangle ECT comprises a rectangle JY corresponding to the emotion of joy. The rectangle FAT comprises a rectangle DT corresponding to the emotion of distraction. The rectangle IBT comprises a rectangle EG corresponding to the emotion of energizing. The rectangle NAV comprises a rectangle DS corresponding to the emotion of dissatisfaction. The rectangle IDT comprises a GP rectangle corresponding to the emotion of guilty pleasure. The rectangle RTM comprises a rectangle DL corresponding to the emotion of delicacy.

It will be clear to those skilled in the art that the present invention is susceptible to various variants and various applications. In particular, the invention is not limited to determining a list of emotions felt by participants in a product test. On the contrary, the present invention can be applied more generally to the determination of themes that can be of any kind, such as, for example, a film genre (visual and auditory), a musical genre (auditory), a product feel (tactile), a video game concept (visual, auditory), or even a vehicle interior concept.

Moreover, it is not necessary to use a table of themes such as Table 1. Indeed, other data structures can easily be developed to determine a theme from physiological measurements. For example, a list of film genres (action, adventure, comedy, thriller, horror, romance, etc.) can be associated with physiological measurements. Furthermore, it is also possible to use other types of physiological measurements, such as breathing rate, agitation movements, facial expression, skin temperature, etc. Also, other types of scores can also be determined from physiological measurements, knowing that these scores are very dependent on the type of physiological measurement.

Methods for identifying a theme other than those described above by calculating distances between points can also be implemented.

Methods for determining scores other than the classification methods using ranges of values, each associated with a score value, described above can also be implemented. Furthermore, it may be possible to implement classifications not based on percentage variations, but directly on the values of physiological measurements, and by setting the range of possible values for the index resulting from this classification.

Furthermore, it is not necessary to take into account designated emojis or values of pleasure and emotional intensity provided by participants, as these indications simply allow for the refinement of the result.

The method described above can be applied to a neurofeedback system, for example, to guide a person in decision-making, or to determine a person's emotional state, for example, in terms of anxiety or stress. It is therefore not essential to apply the procedure to a panel of participants and provide a general result based on the individual results obtained for the participants.

REFERENCES

1. Bradley, Margaret M., et Peter J. Lang. 1994. «Measuring Emotion: The Self-Assessment Manikin and the Semantic Differential». Journal of Behavior Therapy and Experimental Psychiatry 25 (1): 49-59. doi: 10.1016/0005-7916 (94) 90063-9.
2. Bensafi, M., C. Rouby, V. Farget, B. Bertrand, M. Vigouroux, et A. Holley. 2002. «Psychophysiological Correlates of Affects in Human Olfaction». Neurophysiologie Clinique/Clinical Neurophysiology 32 (5): 326-32. doi: 10.1016/S0987-7053 (02) 00339-8.
3. Jack, Rachael E., Oliver G. B. Garrod, Hui Yu, Roberto Caldara, et Philippe G. Schyns. 2012. «Facial Expressions of Emotion Are Not Culturally Universal». Proceedings of the National Academy of Sciences 109 (19): 7241-44. doi: 10.1073/pnas. 1200155109.
4. Warrenburg, S. 2005. «Effects of Fragrance on Emotions: Moods and Physiology». Chemical Senses 30 (Supplement 1): i248-49. doi: 10.1093/chemse/bjh208.
5. Porcherot, Christelle, Sylvain Delplanque, Sophie Raviot-Derrien, Bénédicte Le Calve, Christelle Chrea, Nadine Gaudreau, et Isabelle Cayeux. 2010. «How Do You Feel When You Smell This? Optimization of a Verbal Measurement of Odor-Elicited Emotions». Food Quality and Preference 21 (8): 938-47. doi: 10.1016/j.foodqual.2010.03.012.
6. Churchill, Anne, et John Behan. 2010. «Comparison of Methods Used to Study Consumer Emotions Associated with Fragrance». Food Quality and Preference 21 (8): 1108-13. doi: 10.1016/j.foodqual.2010.07.006.
7. Vidal, Leticia, Gastón Ares, et Sara R. Jaeger. 2016. «Use of Emoticon and Emoji in Tweets for Food-Related Emotional Expression». Food Quality and Preference 49:119-28. doi: 10.1016/j.foodqual.2015.12.002.
8. Jaeger, Sara R., Armand V. Cardello, et Howard G. Schutz. 2013. «Emotion Questionnaires: A Consumer-Centric Perspective». Food Quality and Preference 30 (2): 229-41. doi: 10.1016/j.foodqual.2013.05.015.
9. Thomson, David M. H., et Christopher Crocker. 2015. «Application of Conceptual Profiling in Brand, Packaging and Product Development». Food Quality and Preference 40:343-53. doi: 10.1016/j.foodqual.2014.04.013.
10. Truss. 2004. «Truss 2004 An educational companion to eats shoots & leaves.pdf».
11. Cowie, R., E. Douglas-Cowie, N. Tsapatsoulis, G. Votsis, S. Kollias, W. Fellenz, et J. G. Taylor. 2001. «Emotion Recognition in Human-Computer Interaction». IEEE Signal Processing Magazine 18 (1): 32-80. doi: 10.1109/79.911197.
12. Huang, Albert H., David C. Yen, et Xiaoni Zhang. 2008. «Exploring the Potential Effects of Emoticons». Information & Management 45 (7): 466-73. doi: 10.1016/j.im.2008.07.001.
13. Huffaker, David A., et Sandra L. Calvert. 2006. «Gender, Identity, and Language Use in Teenage Blogs». Journal of Computer-Mediated Communication 10 (2): 00-00. doi: 10.1111/j.1083-6101.2005.tb00238.x.
14. Wolf, Alecia. 2000. «Emotional Expression Online: Gender Differences in Emoticon Use». CyberPsychology & Behavior 3 (5): 827-33. doi: 10.1089/10949310050191809.
15. Barros, Catarina, Ana Rita Pereira, Adriana Sampaio, Ana Buján, et Diego Pinal. 2022. «Frontal Alpha Asymmetry and Negative Mood: A Cross-Sectional Study in Older and Younger Adults». Symmetry 14 (8): 1579. doi: 10.3390/sym14081579.
16. Palacios-Ibáñez, Almudena, Javier Marín-Morales, Manuel Contero, et Mariano Alcañiz. 2023. «Predicting Decision-Making in Virtual Environments: An Eye Movement Analysis with Household Applied Products». Sciences 13 (12): 7124. doi: 10.3390/app 13127,124.
17. Rojas, Juan-Carlos, Javier Marín-Morales, Jose Manuel Ausin Azofra, et Manuel Contero. 2020. «Recognizing Decision-Making Using Eye Movement: A Case Study With Children». Frontiers in Psychology 11:570470. doi: 10.3389/fpsyg.2020.570470.
18. Wedel, Michel, Rik Pieters, et Ralf Van Der Lans. 2023. «Modeling Eye Movements During Decision Making: A Review». Psychometrika 88 (2): 697-729. doi: 10.1007/s11336-022-09876-4.
19. Lim, Jia Zheng, James Mountstephens, et Jason Teo. 2020. «Emotion Recognition Using Eye-Tracking: Taxonomy, Review and Current Challenges». Sensors 20 (8): 2384. doi: 10.3390/s20082384.
20. Zhu, Jianping, Lizhen Ji, et Chengyu Liu. 2019. «Heart Rate Variability Monitoring for Emotion and Disorders of Emotion». Physiological Measurement 40 (6): 064004. doi: 10.1088/1361-6579/ab1887.
21. Golnar-Nik, Parnaz, Sajjad Farashi, et Mir-Shahram Safari. 2019. «The Application of EEG Power for the Prediction and Interpretation of Consumer Decision-Making: A Neuromarketing Study». Physiology & Behavior 207:90-98. doi: 10.1016/j.physbeh.2019.04.025.
22. Hyun, Yong J., Byungho Park, Sanghak Lee, Sungjun Park, et Moon-Yong Kim. 2018. «A Neuro-Scientific Analysis of Affect and Cognition in Consumer Response to the Marketing Stimulus—EEG Analysis of the Relationship between Prefrontal Hemispheric Lateralization and Occipital Alpha Blocking in Ad Exposure». SSRN Electronic Journal. doi: 10.2139/ssrn.3211155.

23. Lin, Meng-Hsien (Jenny), Samantha N. N. Cross, William J. Jones, et Terry L. Childers. 2018. «Applying EEG in Consumer Neuroscience». European Journal of Marketing 52 (1/2): 66-91. doi: 10.1108/EJM-12-2016-0805.

24. Huffmeijer, Renske, Lenneke R. A. Alink, Mattie Tops, Marian J. Bakermans-Kranenburg, et Marinus H. Van IJzendoorn. 2012. «Asymmetric Frontal Brain Activity and Parental Rejection Predict Altruistic Behavior: Moderation of Oxytocin Effects». Cognitive, Affective, & Behavioral Neuroscience 12 (2): 382-92. doi: 10.3758/s13415-011-0082-6.

25. Sandoval, Pamela Simon, et Jesus Garcia-Madariaga. 2024. «Impact of Emotional Appeal on Non-profit Advertising: A Neurophysiological Analysis». Journal of Consumer Behaviour 23 (1): 203-17. doi: 10.1002/cb.2168.

26. Masuo, Yoshinori, Tadaaki Satou, Hiroaki Takemoto, et Kazuo Koike. 2021. «Smell and Stress Response in the Brain: Review of the Connection between Chemistry and Neuropharmacology». Molecules 26 (9): 2571. doi: 10.3390/molecules26092571.

27. Bensafi, M. 2002. «Autonomic Nervous System Responses to Odours: The Role of Pleasantness and Arousal». Chemical Senses 27 (8): 703-9. doi: 10.1093/chemse/27.8.703.

28. Kadohisa, Mikiko. 2013. «Effects of Odor on Emotion, with Implications». Frontiers in Systems Neuroscience 7. doi: 10.3389/fnsys.2013.00066.

29. Marci, Carl D., Debra M. Glick, Rebecca Loh, et Darin D. Dougherty. 2007. «Autonomic and Prefrontal Cortex Responses to Autobiographical Recall of Emotions». Cognitive, Affective, & Behavioral Neuroscience 7 (3): 243-50. doi: 10.3758/CABN.7.3.243.

30. Rodriguez, S., M. Fernandez, A. Cepedabenito, et J. Vila. 2005. «Subjective and Physiological Reactivity to Chocolate Images in High and Low Chocolate Cravers». Biological Psychology 70 (1): 9-18. doi: 10.1016/j.biopsycho.2004.10.001.

31. Ghamari, Mohammad. 2018. «A Review on Wearable Photoplethysmography Sensors and Their Potential Future Applications in Health Care». International Journal of Biosensors & BioeleXctronics 4 (4). doi: 10.15406/ijbsbe.2018.04.00125.

32. Grapperon, J. 2012. «La mesure de la réaction électrodermale».

33. Moya, Ingrit, Jesús García-Madariaga, et María-Francisca Blasco. 2020. «What Can Neuromarketing Tell Us about Food Packaging?» Foods 9 (12): 1856. doi: 10.3390/foods9121856.

34. García-Madariaga, Jesús, Maria-Francisca Blasco López, Ingrit Moya Burgos, et Nuria Recuero Virto. 2019. «Do Isolated Packaging Variables Influence Consumers' Attention and Preferences?» Physiology & Behavior 200: 96-103. doi: 10.1016/j.physbeh.2018.04.030.

35. Plutchik, Robert. 1982. «A Psychoevolutionary Theory of Emotions». Social Science Information 21 (4-5): 529-53. doi: 10.1177/053901882021004003.

36. Zheng, Wei-Long, Jia-Yi Zhu, et Bao-Liang Lu. 2019. «Identifying Stable Patterns over Time for Emotion Recognition from EEG». IEEE Transactions on Affective Computing 10 (3): 417-29. doi: 10.1109/TAFFC.2017.2712143.

The invention claimed is:

1. A method for determining a theme elicited by a product to be characterized, comprising the steps of:
- (a) presenting the product to be characterized to a human subject in such a way as to subject the subject to sensory stimulation;
- (b) acquiring physiological measurement signals from the subject before and during the presentation of the product to be characterized;
- (c) presenting to the subject an image showing a set of emojis during or after the presentation of the product to be characterized, the subject being asked to make a visual choice of emoji from the image;
- (d) acquiring eye tracking signals from the subject during the presentation of the image;
- (e) processing the gaze tracking signals to determine a first emoji number fixed for the longest duration by the subject, the longest duration fixed emoji determining a group of themes likely to be aroused in the subject by the presentation of the product to be characterized; and
- (f) processing the physiological measurement signals acquired before and during the presentation of the product to be characterized, to identify a theme aroused in the subject, within the determined group of themes.

2. The method according to claim 1, wherein the processing of the physiological measurements comprises the use of a table listing themes and in which each theme is associated with an emoji number, and with a point defined by a pleasure score and an emotional intensity score.

3. The method of claim 2, wherein the processing of the physiological measurements comprises the steps of:
- determining a pleasure score and an emotional intensity score from the physiological measurements;
- identifying in the table all the themes corresponding to the first determined emoji number; and
- calculating a distance between a point defined by the determined pleasure and emotional intensity scores and each of the points associated with the themes identified in the table, the theme identified for the subject corresponding to the smallest calculated distance.

4. The method according to claim 1, wherein the processing of the gaze tracking signals provides a second emoji number fixed for the longest duration by the subject, when another emoji has been fixed by the subject for at least 50% of the fixation time of the emoji corresponding to the first emoji number fixed for the longest duration.

5. The method according to claim 1, wherein the acquisition and processing of the physiological measurement signals, comprises steps consisting of:
- acquiring electroencephalogram signals from electrodes placed on the head of the subject, the electrodes comprising right and left pairs of frontal electrodes, during the presentation of the product to be characterized;
- processing the electroencephalogram signals to determine percentage deviations between the right and left electrodes of each of the pairs of frontal electrodes;
- for each percentage deviation, determining a pleasure index based on whether the percentage deviation falls within a range of percentage values in a set of percentage ranges specified for the pleasure indices; and
- determining a pleasure score from the pleasure indices.

6. The method according to claim 5, wherein the pleasure score is determined by adding the pleasure indices to a pleasure rating determined based on whether a pleasure value indicated by the subject falls within a range of pleasure values in a set of pleasure ranges determined for the pleasure values.

7. The method according to claim 1, wherein the acquisition and processing of the physiological measurement signals comprises steps consisting of:

acquiring electrodermal activity signals from electrodermal activity sensors placed on the subject, during a rest period and during a presentation period of the product to be characterized;

processing the electrodermal activity signals to determine mean values and maximum amplitude deviations of the electrodermal activity and heart rate values of the subject, between the rest period and the presentation period of the product to be characterized;

determining a percentage deviation of the mean electrodermal activity values, a percentage deviation of the maximum amplitude deviations of electrodermal activity and a percentage deviation of the heart rate values, between the rest period and the presentation period of the product to be characterized; and for each percentage deviation in electrodermal activity and heart rate, determining an emotional intensity index based on whether the percentage deviation falls within a range of percentage values in a set of percentage ranges determined for the percentage deviation; and determining an emotional intensity score from the emotional intensity indices.

8. The method according to claim 7, wherein the emotional intensity score is determined by adding the emotional intensity indices to an emotional intensity rating determined based on whether an emotional intensity value indicated by the subject falls within a range of emotional intensity values in a set of emotional intensity ranges determined for the emotional intensity values.

9. The method according to claim 1, wherein the subject belongs to a group of participants, the method comprising the steps of:

performing the steps (a) to (f) for each participant in the group of participants to determine a theme for the participant; and determining a thematic characterization result of a perception of the product to be characterized based on the themes determined for all the participants in the group of participants.

10. The method according to claim 9, wherein the sensory characterization result comprises a list of themes in which each theme is associated with a theme score determined based on the number of times the theme was identified for a participant in the group of participants.

11. A system comprising:

a computer, an eye tracking device connected to the computer, physiological parameter measuring devices connected to the computer, and a display screen connected to the computer, the processor being configured to implement the method according to claim 1.

12. The system according to claim 11, wherein the physiological parameter measuring devices comprise:

a set of electroencephalogram electrodes, and a device for measuring electrodermal and cardiac activity.

* * * * *